United States Patent
Stefani et al.

(10) Patent No.: US 11,043,873 B2
(45) Date of Patent: Jun. 22, 2021

(54) CONNECTION UNIT FOR A WIPER MOTOR AND WIPER MOTOR

(71) Applicant: Valeo Systèmes d'Essuyage, Le Mesnil Saint Denis (FR)

(72) Inventors: Siegfried Stefani, Bietigheim-Bissingen (DE); Christof Heuberger, Bietigheim-Bissingen (DE); Harald Kapitza, Ludwigsberg (DE); David Rignault, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 208 days.

(21) Appl. No.: 16/062,505

(22) PCT Filed: Dec. 14, 2016

(86) PCT No.: PCT/EP2016/080881
§ 371 (c)(1),
(2) Date: Jun. 14, 2018

(87) PCT Pub. No.: WO2017/102781
PCT Pub. Date: Jun. 22, 2017

(65) Prior Publication Data
US 2018/0375401 A1    Dec. 27, 2018

(30) Foreign Application Priority Data
Dec. 17, 2015    (DE) .................... 10 2015 122 095.4

(51) Int. Cl.
*H02K 5/22*    (2006.01)
*H02K 5/14*    (2006.01)
(Continued)

(52) U.S. Cl.
CPC ................ *H02K 5/225* (2013.01); *B60S 1/08* (2013.01); *H01R 13/245* (2013.01); *H02K 5/148* (2013.01);
(Continued)

(58) Field of Classification Search
CPC ........ H02K 11/21; H02K 11/38; H02K 5/148; H02K 5/225
See application file for complete search history.

(56) References Cited

U.S. PATENT DOCUMENTS 5,979,256 A * 11/1999 Kilker .................... B60S 1/166
15/250.3
7,109,617 B2    9/2006 Mizutani et al.
(Continued)

FOREIGN PATENT DOCUMENTS

CN    1774853 A    5/2006
CN    103946071 A    7/2014
(Continued)

OTHER PUBLICATIONS

First Office Action in corresponding Chinese Application No. 201680074119.0, dated Jun. 28, 2019 (14 pages).
(Continued)

*Primary Examiner* — Thienvu V Tran
*Assistant Examiner* — Bart Iliya
(74) *Attorney, Agent, or Firm* — Osha Bergman Watanabe & Burton LLP

(57) ABSTRACT

The invention relates to a connection unit (20) for a wiper motor (100) for windshield wiper systems with a plug connector element (22) for receiving electric connection lines (24) which are configured for the at least indirect contacting of a commutator (6) of an electric motor (1), with a carrier element (26) on which connection elements (40) for contacting the commutator (6) and/or at least one component
(Continued)

Figure 1:
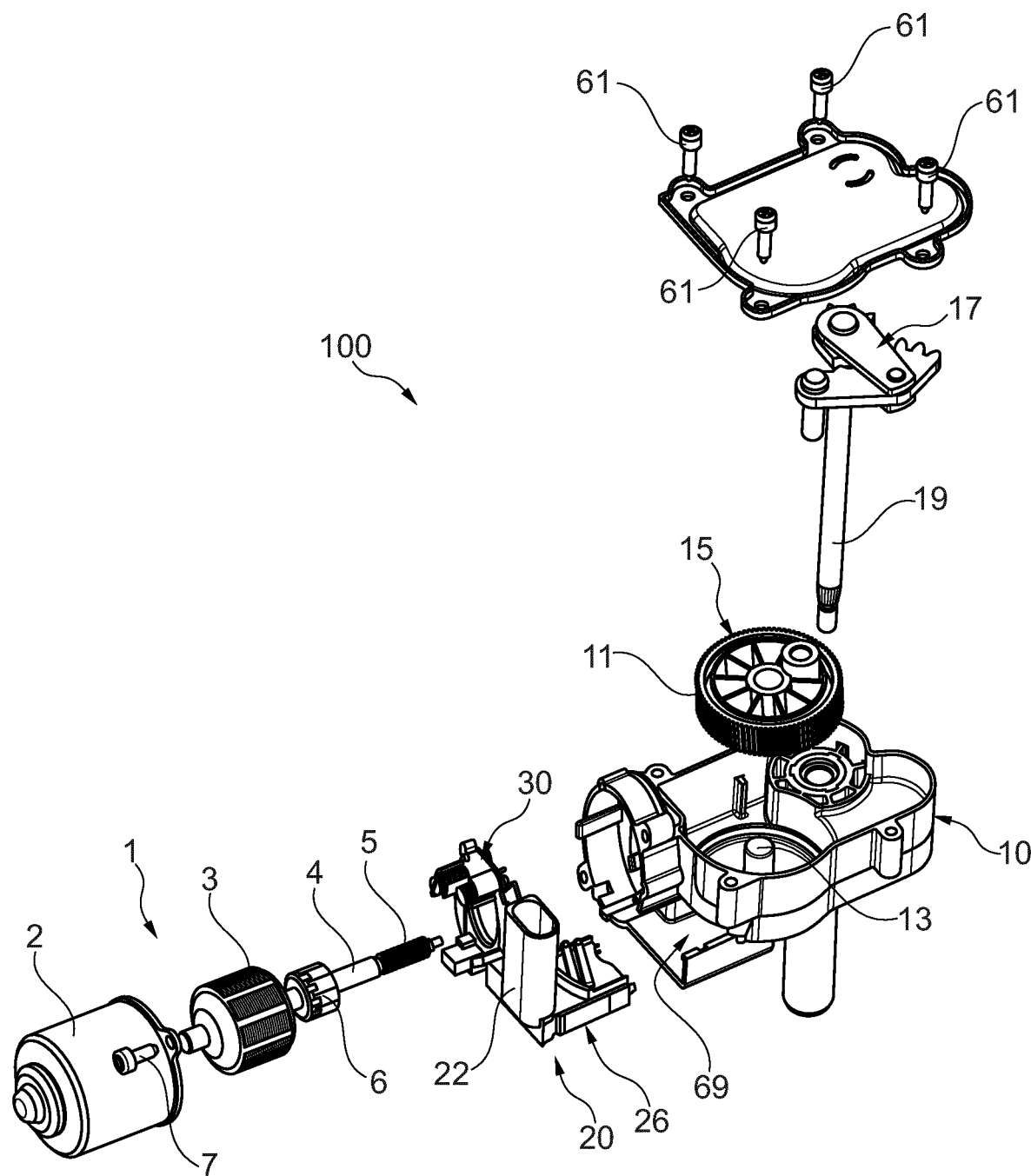

of an electric circuit are arranged, and with a carbon brush holder plate (30), wherein the carrier element (26) is formed as a pre-mountable construction unit (32) with the carbon brush holder plate (30) formed as separate component.

12 Claims, 6 Drawing Sheets

(51) Int. Cl.
  *H02K 11/21* (2016.01)
  *H02K 11/38* (2016.01)
  *B60S 1/08* (2006.01)
  *H01R 13/24* (2006.01)
  *H02K 7/116* (2006.01)
(52) U.S. Cl.
  CPC ........... *H02K 7/1166* (2013.01); *H02K 11/21* (2016.01); *H02K 11/38* (2016.01)

(56) References Cited

U.S. PATENT DOCUMENTS

| | | |
|---|---|---|
| 2004/0066111 A1 | 4/2004 | Torii |
| 2005/0264127 A1* | 12/2005 | Benkert ............... H02K 11/026 310/239 |
| 2007/0278873 A1* | 12/2007 | Macaire ................ H02K 5/225 310/71 |
| 2009/0134743 A1 | 5/2009 | Hornung et al. |
| 2012/0000303 A1* | 1/2012 | Stefani ..................... B60S 1/26 74/89.14 |
| 2012/0025643 A1* | 2/2012 | Shibusawa ............ H02K 5/225 310/71 |
| 2013/0093267 A1* | 4/2013 | Hartmann ............... B60S 1/166 310/43 |

FOREIGN PATENT DOCUMENTS

| | | |
|---|---|---|
| CN | 103986003 A | 8/2014 |
| CN | 105052017 A | 11/2015 |
| DE | 10331238 A1 | 2/2005 |
| DE | 102005020790 A1 | 11/2006 |
| DE | 10 2005 047428 A1 | 4/2007 |
| DE | 10 2010 056464 A1 | 7/2012 |
| EP | 0603083 A1 | 6/1994 |
| FR | 2 821 214 A1 | 8/2002 |
| JP | 2001251808 A | 9/2001 |
| JP | 2007-006549 A | 1/2007 |
| JP | 2009100593 A | 5/2009 |
| KR | 10-2006-0120330 A | 11/2006 |

OTHER PUBLICATIONS

International Search Report issued in PCT/EP2016/080881 dated Mar. 15, 2017 (2 pages).
Written Opinion of the International Searching Authority issued in PCT/EP2016/080881 dated Mar. 15, 2017 (6 pages).
Notification of Reason for Rejection in corresponding Japanese Application No. 2018-531650, dated Jan. 5, 2021 (7 pages).

* cited by examiner

CONNECTION UNIT FOR A WIPER MOTOR AND WIPER MOTOR

PRIOR ART

The invention relates to a connection unit for a wiper motor for windshield wiper systems according to the preamble of claim 1. Furthermore, the invention relates to a wiper motor using a connection unit according to the invention.

A connection unit for a wiper motor for windshield wiper systems having the features of the preamble of claim 1 is known from U.S. Pat. No. 7,109,617 B2. The known connection unit comprises a plug connector element for the reception of electric connection lines, which are formed for the at least indirect contacting of a commutator of an electric motor. At the same time, the plug connector element is designed as a carrier element, on which contacts for contacting a carbon brush holder plate for the commutator of the electric motor are arranged. Here, the essential factor is that the plug connector element or the carrier element of the connection unit forms a pre-mountable construction unit together with the carbon brush holder plate formed as a separate component. To that end, the carbon brush holder plate and the plug connector element are connected with one another via plug connector, possibly using additional fastening elements or a construction unit, in which an opening is formed, in order to receive sections of the carrier element or of the pug connector element and the carbon brush holder plate. Such a design of the connection unit for connecting the carrier element to the carbon brush holder plate is relatively elaborate in terms of construction, requires a large construction space and relatively high mounting efforts.

DISCLOSURE OF THE INVENTION

Based upon the described prior art, the object underlying the invention is to develop a connection unit for a wiper motor for windshield wiper systems according to the preamble of claim 1 in such a way that a simplified mounting process of the pre-mountable construction unit consisting of the carrier element and the carbon brush holder plate is made possible.

According to the invention, in a connection unit for a wiper motor for windshield wiper systems having the features of claim 1, this object is essentially achieved in that a latch connection is formed between the carrier element and the carbon brush holder plate. In a direct connection (i.e. without additional fastening elements or components) between the carrier element and the carbon brush holder plate, such a latch connection thus allows connecting the above-mentioned components to one another without tools. Such a latch connection particularly provides the advantage that erroneous installation can be prevented and a particularly safe or reliable connection is made possible.

Advantageous developments of the connection unit according to the invention for a wiper motor for windshield wiper systems are indicated in the dependent claims. All combinations of features disclosed in the claims, the description and the figures are in the scope of the invention.

A particularly preferred structural configuration of the connection unit provides that the plug connector element is connected directly to the carrier element together with the electric connection lines.

In order to connect the carrier element to the carbon brush holder plate not only in a mechanical manner via the latch connection, but also establish an electric connection, it is further provided that electric connection elements each interacting with one another are formed or provided on the carrier element and the carbon brush holder plate.

Here, it is particularly advantageous if the electric connection elements are arranged outside the area of the latch connection, since a better accessibility to the connection elements is made possible thereby, particularly if these are connected to one another by means of a device.

The electric connection elements particularly comprise a plate-shaped contact section, wherein the contact sections of the electric connection elements can be connected to one another in parallel alignment. The connection between the contact sections can be effected by means of a solder, a crimp, a plug or a weld connection, or by a spring-loaded abutment contact.

For the formation of the latch connection between the carbon brush holder plate and the carrier element, it is provided that at least one latch protrusion or a latch opening is formed on the carbon brush holder plate, which interacts with at least one latch opening or one latch protrusion on the carrier element.

Furthermore, in a structurally preferred embodiment, it is provided that the carbon brush holder plate comprises a plate-shaped carrier area with a through-opening for a drive shaft of the electric motor, and that the plane of the carrier element and of the carrier area are arranged perpendicular to one another. This predominantly achieves an advantageous mounting process of the pre-mountable unit in conjunction with a drawer-shaped insertion opening for the connection unit, since the construction unit can be connected to the gearbox by a linear movement then, wherein the carbon brush holder plate is positioned in relation to the anchor shaft at the same time.

The invention also includes a wiper motor for windshield wiper systems, wherein the wiper motor comprises an electric motor having a drive shaft, wherein the drive shaft interacts with a gear wheel inside a gearbox, and wherein the wiper motor comprises an above-described connection unit.

Furthermore, it is particularly preferred if a latch connection is formed between the gearbox and the connection unit in the mounting position. This enables mounting the connection unit in the gearbox without tools.

Further advantages, features and details of the invention result from the following description of preferred exemplary embodiments as well as by means of the drawing.

Figure 2:
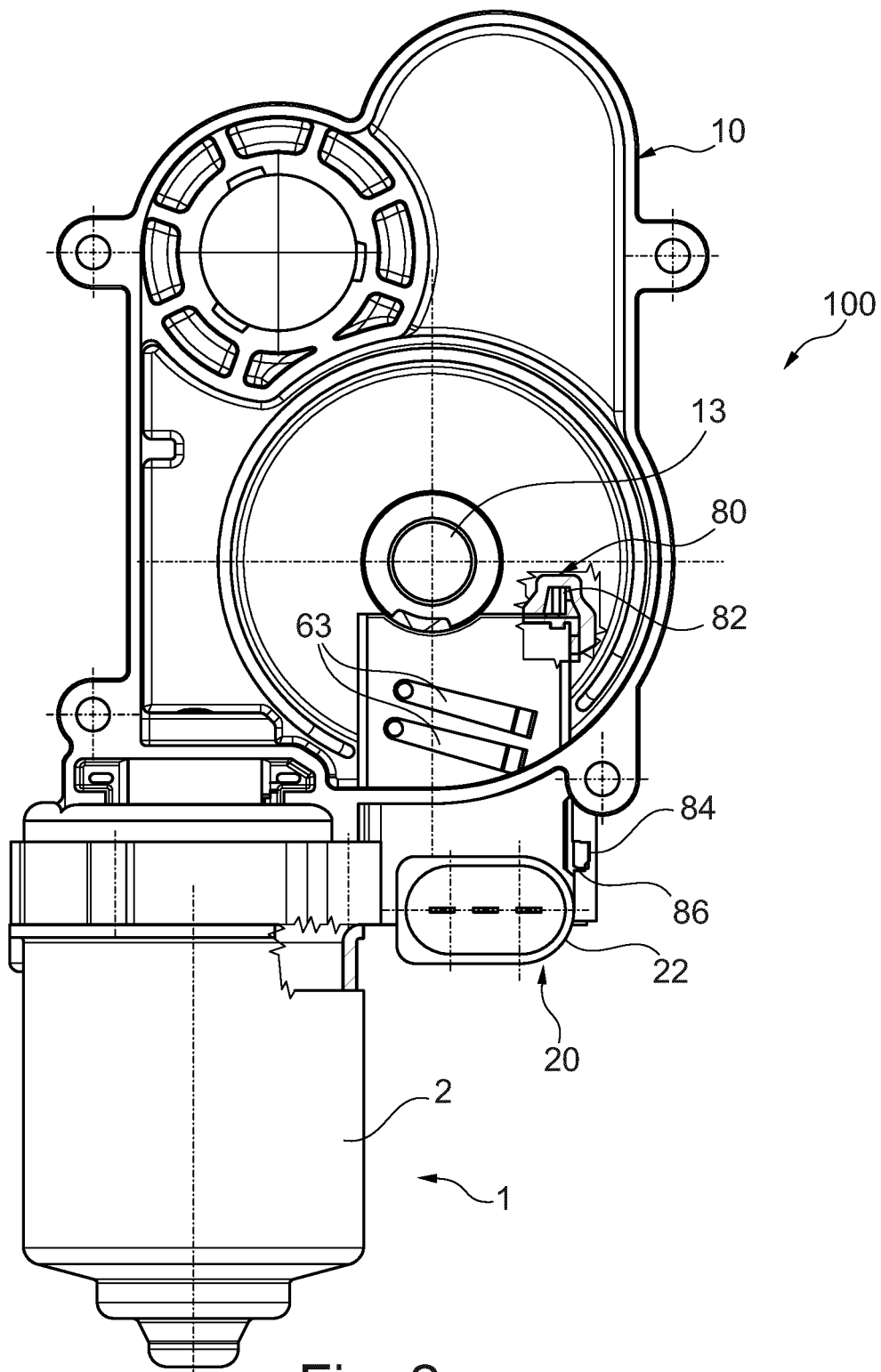
Figure 4:
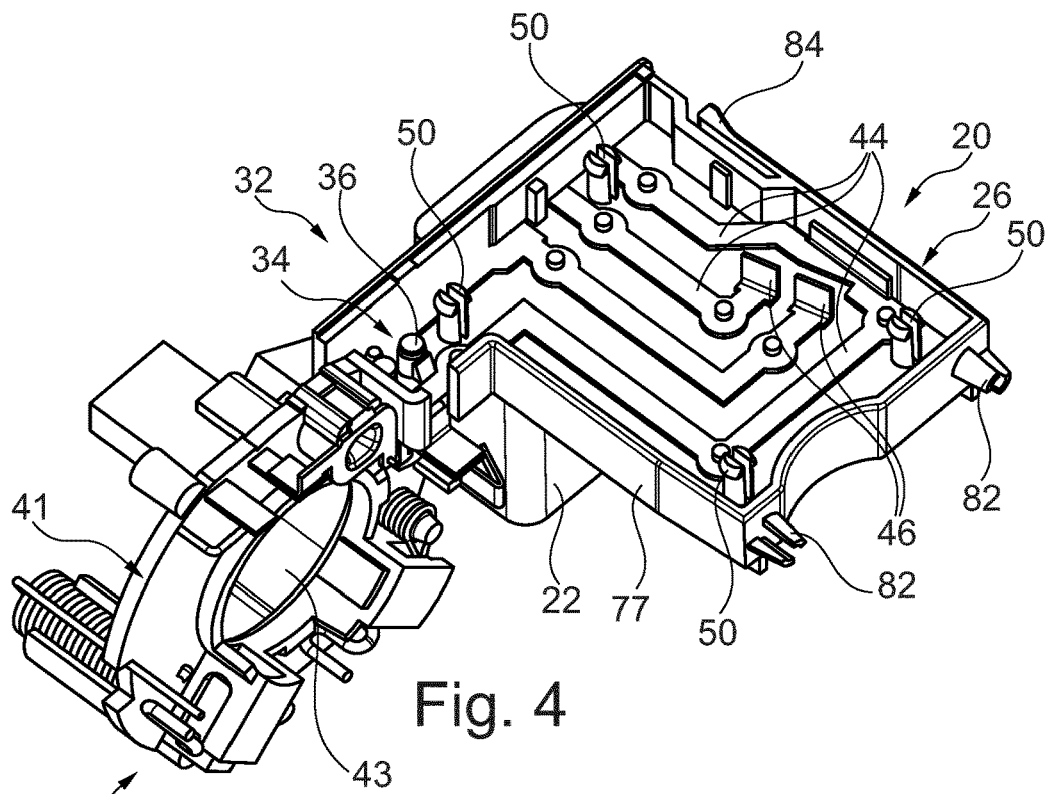
Figure 3:
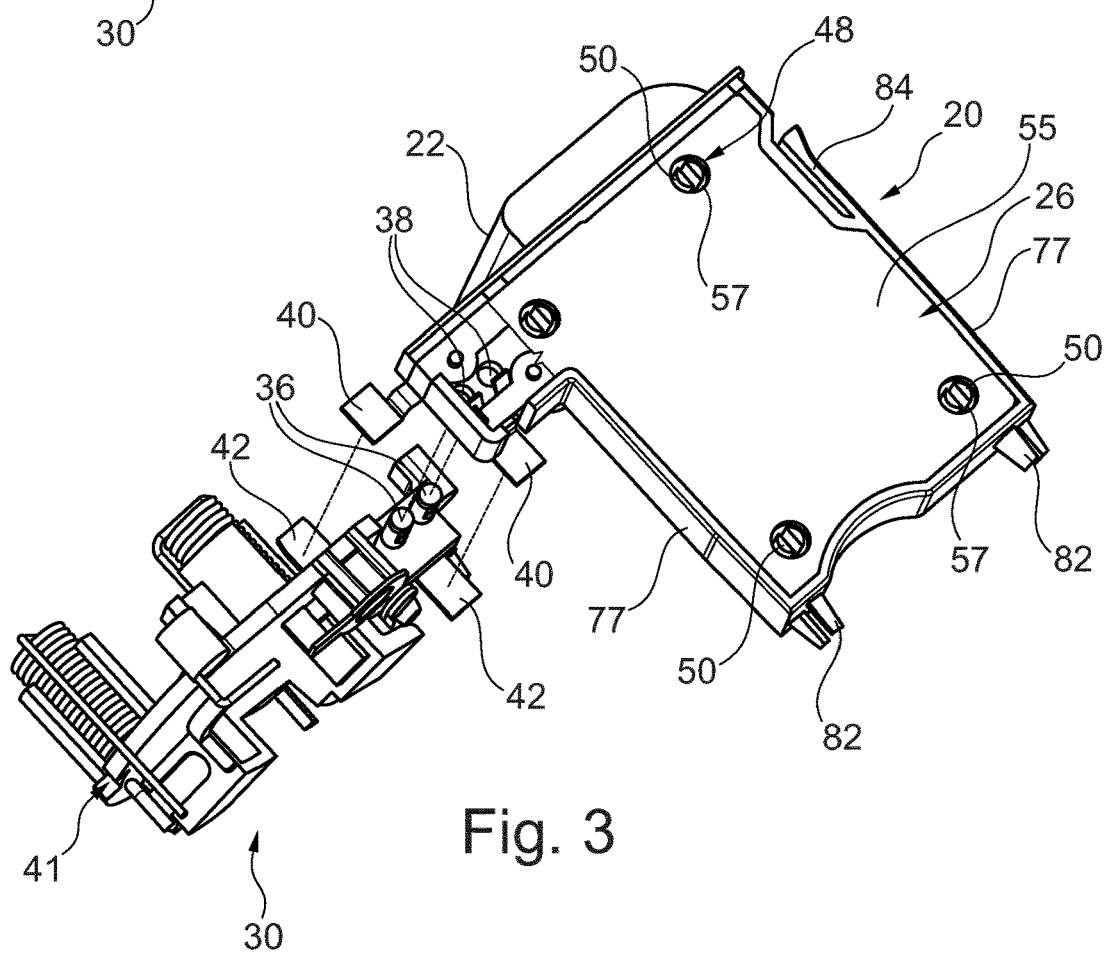
Figure 5:
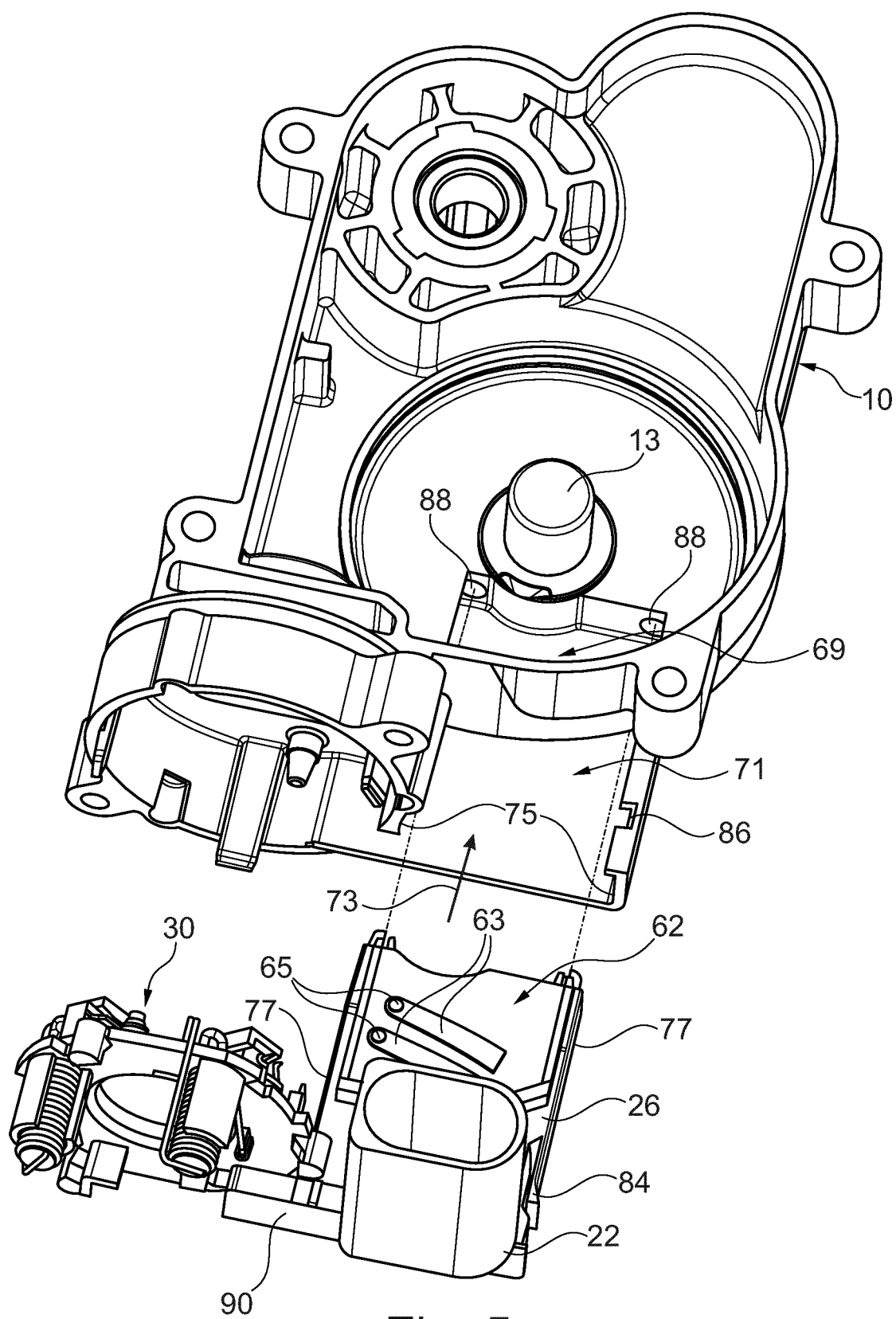
Figure 6:
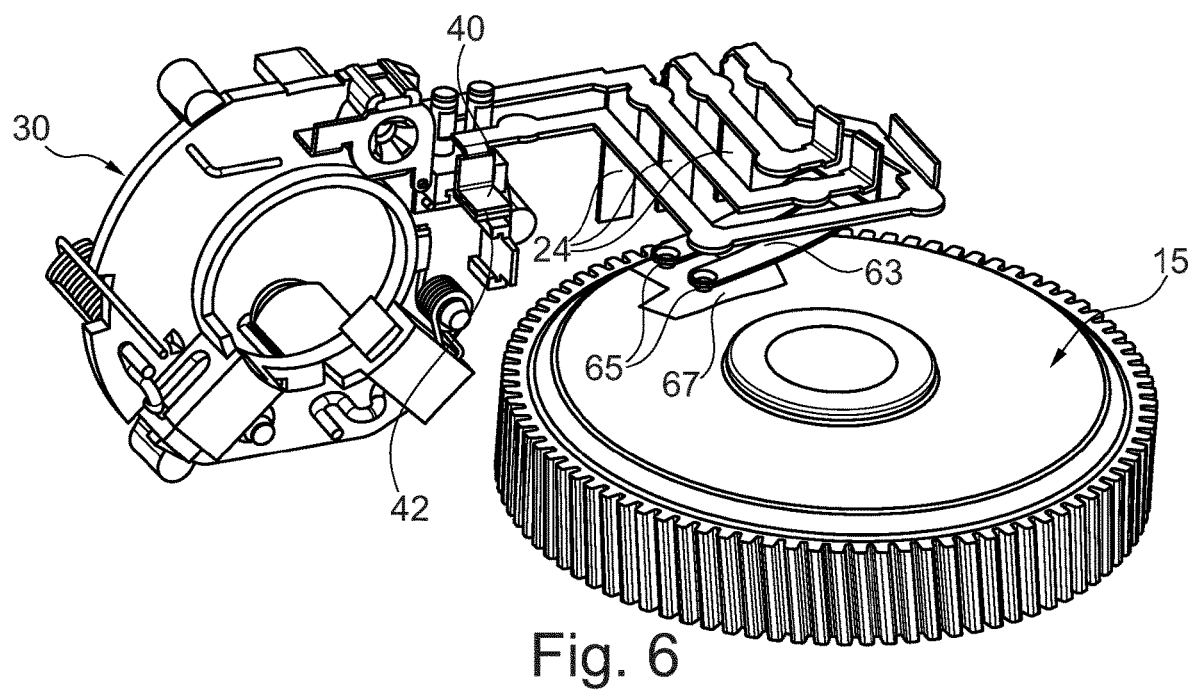
Figure 7:
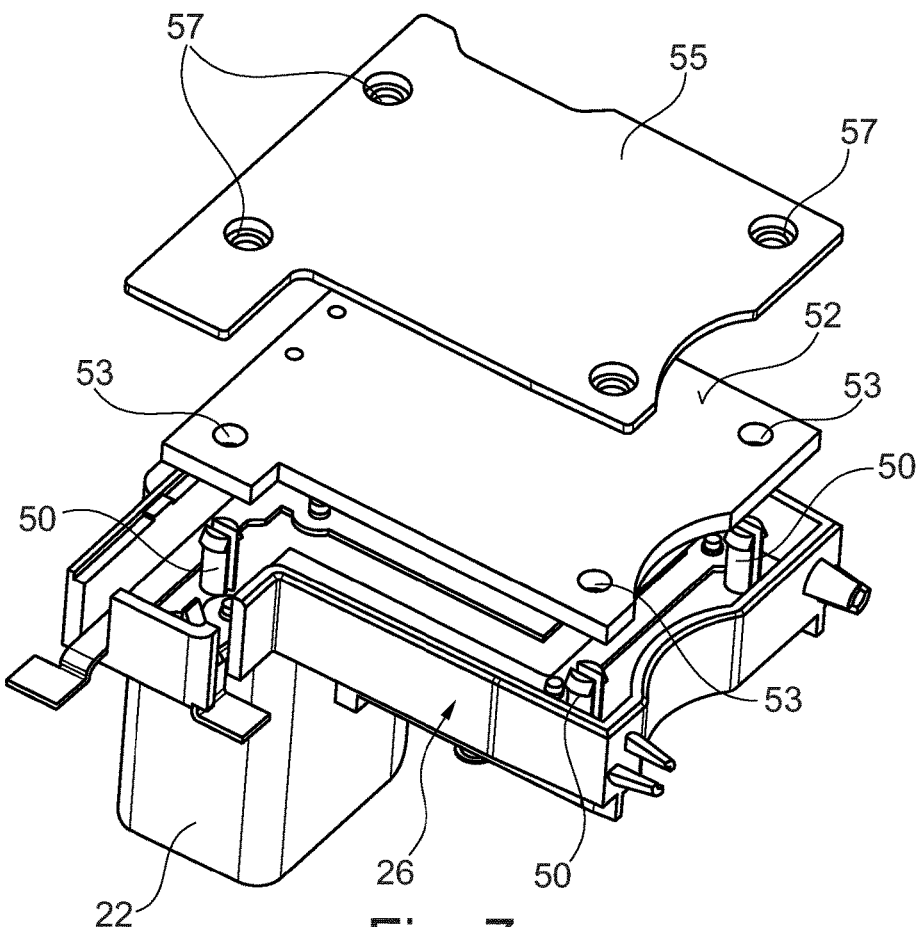
Figure 8:
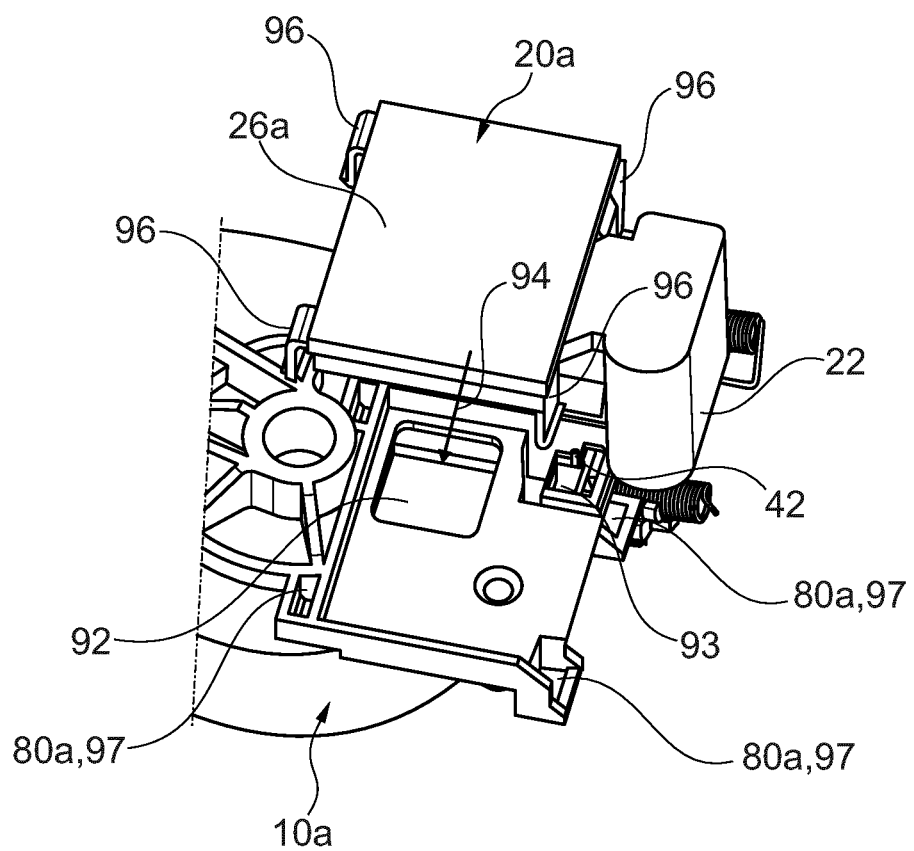

The drawing shows in:

FIG. 1 the essential components of a wiper motor for a windshield wiper system in an exploded view, FIG. 2 the wiper motor according to FIG. 1 in a partially mounted state in a plan view, FIGS. 3 and 4 the parts of a carbon brush holder plate and a connection unit prior to and after the connection in a perspective view, FIG. 5 parts of the wiper motor during the insertion of the connection unit into an insertion opening of a gearbox in a perspective view, FIG. 6 an assembly consisting of a carbon brush holder plate with contacts for contacting a mating element on the gear wheel in a perspective view, FIG. 7 the components of a modified connection unit in a perspective view, and FIG. 8 a perspective illustration of a once more modified connection unit, which can be connected to a gearbox region in the type of a housing cover in a perspective illustration.

Like elements or elements having the same function are indicated with like reference numerals throughout the drawings.

FIGS. 1 and 2 show the essential components of a wiper motor 100 serving as a part of a windshield wiper system in particular, without limitation, in the rear area of a motor vehicle for cleaning a window with a wiper arm having a wiper blade (not illustrated).

The wiper motor 100 comprises a brush-type (electric) motor 1, which has a pot-shaped motor housing 2 made of sheet metal produced as a separate component in a deep-drawing process. An anchor 3 is rotatably supported within the motor housing 2, the anchor shaft 4 acting as a drive shaft thereof protruding with a toothing section 5 into a gearbox 10 preferably consisting of a metal (aluminum) and produced in a pressure die casting method, wherein in a reception space of the gearbox 10, the toothing section 5 intermeshes with a counter toothing 11 of a gear wheel 15 rotatably supported in an axis 13 in the gearbox 10. The gear wheel 15 is at least indirectly coupled to a drive shaft 19 via a lever mechanism 17, and a wiper arm having the above-mentioned wiper blade can be fixed to the drive shaft (not shown).

Furthermore, as can particularly be seen in conjunction with FIGS. 1 to 4, the wiper motor 100 comprises a connection unit 20 which has a plug connector element 22 for the reception of electric connection lines 24 (FIG. 6). In particular, the wiper motor 100 can be actuated via the cable tree of the motor vehicle by means of the plug connector element 22 or the electric connection lines 24. Furthermore, the connection unit 20 comprises a plate-shaped carrier element 26, which carries at least one electric or electronic component (not shown), or which is connectable to an electronic circuit, which is at least indirectly connected to the carrier element 26.

In the illustrated exemplary embodiment, the plug connector element 22, which consists of a plastic material just like the carrier element 26, is formed as an integral (monolithic) component in such a way that the electric connection lines 24 are directly connected to the plug connector element 22 and the carrier element 26 or are at least sectionally enclosed or cast-around by the material of the plug connector element 22 and the carrier element 26.

It may also be provided that the plug connector element 22 and the carrier element 26 are formed as separate components, which are connected to one another for example via a latch connection, a screw connection or another suitable connection.

The connection unit 20 is connected to a carbon brush holder plate 30 in such a way that the carbon brush holder plate 30 and the connection plate 20 form a pre-mountable construction unit 32. To that end, a latch connection 34 is formed between the carrier element 26 and the carbon brush holder plate 30. The latch connection 34 comprises latch trunnions 36 formed on the carbon brush holder plate 30, which interact with corresponding latch openings 38 in the region of the carrier element 26 in order to form the latch connection 34 when fitting the latch trunnions 36 into the latch openings 38. Furthermore, electric connection elements 40 are provided in the area of the carrier element 26 outside the area of the latch connection 34, which are approximately shaped in the type of plates and which are at least indirectly electrically connected to the electric connection lines 24. The electric connection elements 40 interact with the electric connection elements 42 arranged in the carbon brush holder plate 30, which get into an electrically conductive contact to the electric connection elements 40 when forming the latch connection 34, for example. Here, it may be provided that the electric connection elements 40, 42 are elastically pre-bent in order to rest against one another subjected to a spring force when forming the latch connection 34.

However, it may also be possible or provided to form the connection between the connection elements 40, 42 by means of a solder, crimp or weld connection, or by any other connection technique.

The electric connection elements 42 in the carbon brush holder plate 30 serve for the electric contacting of the commutator 6 of the electric motor 1 discernable in FIG. 1.

The carbon brush holder plate 30 comprises a plate-shaped carrier region 41 with a through-opening 43 for guiding through the anchor shaft 4, wherein, if the construction unit 32 is mounted, the planes of the carrier region 41 and of the plate-shaped carrier element 26 are arranged perpendicular to one another.

Furthermore, the carrier element 26 comprises lead frame elements 44 integrally formed with the connection lines 24 on a side 28, the end sections of which are partially formed in the type of contact sections 46 (FIG. 4). Via the contact section 46, a circuit carrier 52 merely shown in FIG. 7, which carries an electronic circuit (not shown) can be connected via another latch connection 48 with latch trunnions 50 arranged at the carrier element 26, the circuit carrier 52 comprising corresponding latch openings 53 to that end. Furthermore, it can be provided that in accordance with FIGS. 3 and 7, the circuit carrier 52 is covered or protected by means of a cover plate 55, wherein the cover plate 55 also participates in the further latch connection 48 via latch openings 57.

In order to close the reception space of the gearbox 10 after installation of the required components, the gearbox 10 further comprises a gear cover 59, which can be connected to the gearbox 10 by means of fastenings screws 62 (FIG. 1).

As can be discerned in particular in conjunction with FIGS. 5 and 6, two additional spring-loaded contacts 63 are provided on the side 62 of the carrier element 26 opposite the contact sections 46 in the area of the carrier element 26 in an exemplary manner, the spring-loaded contacts being electrically contacted to the electronic circuit in the area of the circuit carrier 52, for example. The contacts 63 connected to the lead frame elements 44 but against a contact element 67 arranged fixed in location to the gear wheel 15 in FIG. 6 in a spring-loaded manner with its point-shaped abutment regions 65 in the mounted state of the connection unit 20 in the gearbox 10, the contact element acting as a mating contact of the contacts 63. The position of the gear wheel 15 and thus also the position of the wiper arm and the wiper blade in the return position can be detected via the contacts 63.

The connection unit 20 in the mounted state is arranged inside the gearbox 10 in such a way that the contacts 63, in particular the abutment regions 65, are arranged at least at a partial overlap with the gear wheel 15. To that end, the gearbox 10 comprises a reception 69 with an insertion opening 71, which interacts with the connection unit 20 in the type of a drawer. As can particularly be discerned in FIGS. 2 to 5, the reception 69 comprises groove-shaped guidance elements 75 formed parallel to an insertion direction 73 interacting with mating guidance elements 77 formed at the lateral peripheral regions of the carrier element 26, in order to guide the connection unit 20 with a relatively small clearance during the insertion into the insertion opening 71. Furthermore, a latch connection 80 is formed between the connection unit 20 and the gearbox 10 in the mounted position of the connection unit 20 in the reception 69 of the gearbox 10 (FIG. 2). By way of example, the latch connection 80 includes, as can particularly be discerned in FIGS. 2 to 4, latch trunnions 82 protruding in the direction of the insertion opening 71 as well as at least one latch hook 84 arranged laterally at the carrier 26, wherein the hook interacts with a latch opening 86 (discernable in FIGS. 2 and 5), and wherein the latch trunnions 82 interact with circular latch openings 88 (also discernable in FIG. 5).

When mounting the wiper motor 100, the construction unit 32 pre-mounted from the connection unit 20 and the carbon brush holder plate 30 is inserted in the reception 69 of the gearbox 10 together with the connection unit 20 all the way until the latch connection 80 is achieved. Subsequently, for example the electric motor 10 with its motor housing 2 can be connected to the gearbox 10 by means of the fastening screws 7 discernable in FIG. 1. Here, the essential factor is that according to the illustration of FIG. 2, if the electric motor 1 or motor housing 2 is mounted, the motor housing 2 is connected to the gearbox 10 in such a way that the motor housing 2 rests against a stop surface 90 of the carrier element 26 discernable in FIG. 5 and functions there as a stop in a direction opposite to the insertion direction 73.

FIG. 8 shows a variant of the connection unit 20, in which the connection unit is not connected to the carbon brush holder plate 30, which is not shown in detail in FIG. 8. The connection unit 20a, in particular the carrier element 26a, is rather formed in such a way that it closes or covers two openings 92, 93 formed in the gearbox 10a at the outer side of the gearbox 10a in the mounted state. Here, one opening is formed in the region of the gear wheel 15, so that the contacts 63 are capable of interacting with the contact element 67. The other opening 93 allows contacting the connection elements 40 formed at the carrier element 26a with connection elements 42 arranged in the area of opening 93. To that end, the connection unit 20a is connected to the gearbox 10a in the direction of the arrow 94, wherein latch protrusions 96 as well as latch openings 97 are formed both at the connection unit 20a and at the gearbox 10a, in order to form a latch connection 80a.

The above-described wiper motor 100 or the connection unit 20, 20a can be modified or changed in various ways and manners without departing from the principles if the invention.

LIST OF REFERENCE NUMERALS 1 motor
2 motor housing
3 anchor
4 anchor shaft
5 toothing section
6 commutator
7 fastening screw
10, 10a gearbox
11 counter toothing
13 axis
15 gear wheel
17 lever mechanism
19 drive shaft
20, 20a connection unit
22 plug connector element
24 connection line
26, 26a carrier element
28 side
30 carbon brush holder plate
32 construction unit
34 latch connection
36 latch trunnions
38 latch opening
40 connection element
41 carrier region
42 connection element
43 through opening
44 lead frame element
46 contact section
48 latch connection
50 latch trunnion
52 circuit carrier
53 latch opening
55 cover plate
57 latch opening
59 gear cover
61 fastening screw
62 side
63 contact
65 abutment region
67 contact element
69 reception
71 insertion opening
73 insertion direction
75 guidance
77 guidance element
80, 80a latch connection
82 latch trunnion
84 latch hook
86 latch opening
88 latch opening
90 stop surface
92 opening
93 opening
94 arrow
96 latch protrusion
97 latch opening
100 wiper motor

The invention claimed is:

1. A connection unit for a wiper motor for windshield wiper systems, the connection unit comprising:

a plug connector element for receiving electric connection lines which are configured for at least indirect contacting of a commutator of an electric motor;

a carrier element on which connection elements for contacting the commutator and/or at least one component of an electric circuit are arranged; and a carbon brush holder plate, comprising a plate-shaped carrier region with a through opening for a drive shaft of the electric motor, wherein planes of the carrier element and the carrier region are arranged perpendicular to one another, wherein the carrier element is formed as a pre-mountable construction unit with the carbon brush holder plate formed as separate component, wherein the carrier element is at least essentially formed plate-shaped, wherein a latching connection is formed between the carrier element and the carbon brush holder plate, and wherein the electric connection lines are directly connected to the plug connector element and the carrier element or are at least sectionally enclosed or cast-around by the material of the plug connector element and the carrier element.

2. The connection unit according to claim 1, wherein connection elements interacting with the connection elements are arranged on the carbon brush holder plate.

3. The connection unit according to claim 2, wherein the electric connection elements are arranged outside the area of the latching connection.

4. The connection unit according to claim 2, wherein the electric connection elements are formed in the type of a plate and are oriented parallel to one another.

5. The connection unit according to claim 4, wherein the connection elements are connected to one another by a clamp, solder, crimp, plug or weld connection.

6. The connection unit according to claim 1, wherein at least one latching protrusion or latch opening is formed on the carbon brush holder plate for forming the latch connection which interacts with at least one latch opening or one latching protrusion on the carrier element.

7. The connection unit according to claim 1, wherein the carrier element is formed for receiving or fixing a circuit carrier for an electronic circuit.

8. A wiper motor for windshield wiper systems comprising:
   an electric motor comprising a drive shaft, wherein the drive shaft interacts with a gear wheel inside a gearbox; and
   a connection unit according to claim 1.

9. The wiper motor according to claim 8, wherein the gear box comprises a reception with an insertion opening, into which at least a part of the connection unit can be inserted from outside the gear box in the type of a drawer.

10. The wiper motor according to claim 8, wherein the gear box has an opening to which the connection elements of the connection unit extend into, and wherein the connection unit is connected with the gear box at the outside of the gear box in the region of a face side of the connection unit.

11. The wiper motor according to claim 10, wherein the opening is covered by the connection unit when the connection unit is mounted.

12. The wiper motor according to claim 8, wherein a latch connection is constructed between the gear box and the connection unit in the installation position.

* * * * *